United States Patent [19]
Carrick

[11] 3,993,324
[45] Nov. 23, 1976

[54] BOAT TRAILER

[75] Inventor: Lawrence K. Carrick, Spokane, Wash.

[73] Assignee: Calkins Manufacturing Company, Spokane, Wash.

[22] Filed: Aug. 4, 1975

[21] Appl. No.: 601,800

[52] U.S. Cl. .......................... 280/414 R
[51] Int. Cl.² ........................... B60P 3/10
[58] Field of Search ........... 280/414 R; 214/85, 505

[56] References Cited
UNITED STATES PATENTS

| | | | |
|---|---|---|---|
| 3,021,969 | 2/1962 | Peake | 280/414 R X |
| 3,026,981 | 3/1962 | Youtie | 280/414 R X |
| 3,130,842 | 4/1964 | Melloni | 280/414 R X |
| 3,584,753 | 6/1971 | Voeller | 214/505 X |
| 3,785,677 | 1/1974 | Calkins | 280/414 R |
| 3,812,986 | 3/1973 | Rogers | 280/414 R X |
| 3,822,899 | 7/1974 | Slack | 280/414 R |
| 3,842,998 | 10/1974 | Borum | 280/414 R X |

FOREIGN PATENTS OR APPLICATIONS 274,946   6/1914   Germany .................. 280/414 R

*Primary Examiner*—Philip Goodman
*Assistant Examiner*—R. Schrecengost
*Attorney, Agent, or Firm*—Wells, St. John & Roberts

[57] ABSTRACT

A trailer for carrying a centerboard type sailboat behind a towing vehicle. The trailer includes longitudinally flexible bunks that receive and conform intimately to the hull configuration on opposite sides of the longitudinal boat center line. A walking beam arrangement is located between the bunks and carrying frame to enable free flexing of the bunks while transferring weight of the boat to the framework. The longitudinal resiliency of the bunks enables loading and unloading of the sailboat in relatively shallow water and further facilitates even distribution of the sailboat weight over the entire bunk surface engaged therewith.

5 Claims, 7 Drawing Figures

U.S. Patent  Nov. 23, 1976  Sheet 3 of 3  3,993,324
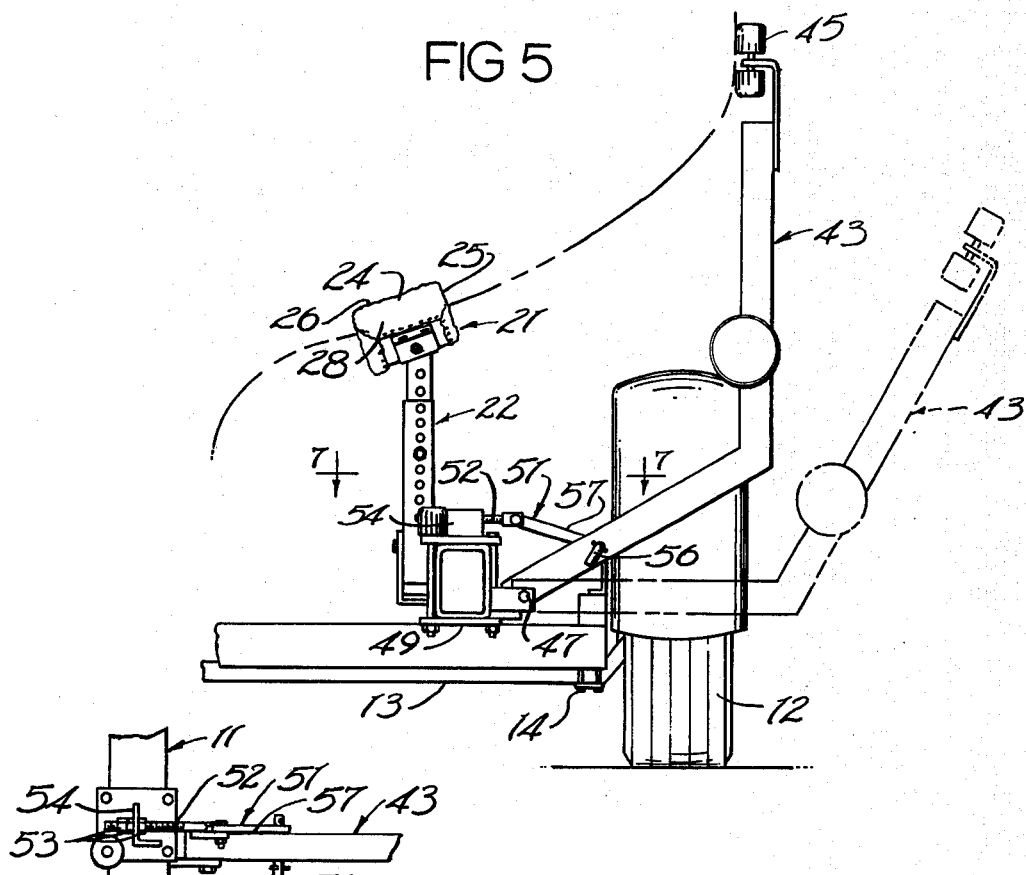
FIG 5
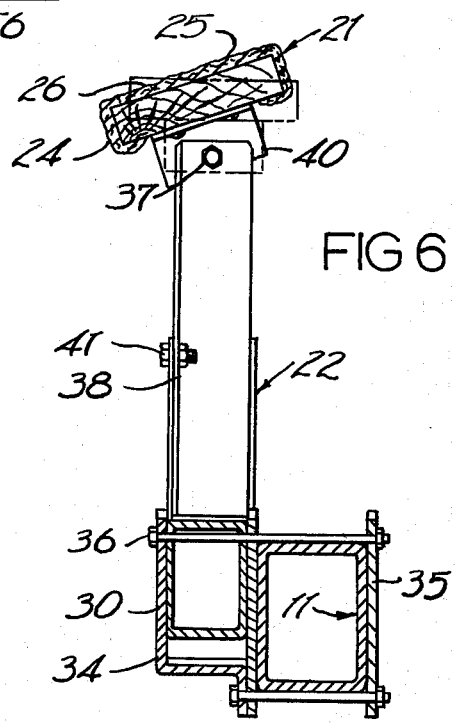
FIG 7
FIG 6

BOAT TRAILER

BACKGROUND OF THE INVENTION

The present invention is related to trailers and more specifically to trailers utilized to carry a watercraft behind a towing vehicle.

Some difficulty has been experienced in loading and unloading of centerboard type sailboats to boat trailers. It has been found that the usually fragile hulls of such boats are easily damaged while being carried on a trailer and especially while being loaded and unloaded from the trailers. Centerboard sailboats generally have a vertically adjustable keel of considerable weight. When held on a trailer, such boats are ordinarily supported on opposite sides of the centerboard with the centerboard itself being held within the sailboat in a raised condition, or supported by a central roller or other provision on the boat trailer. Previous trailers utilize a stationary "form fitting" bunk arrangement that is preformed to conform to the hull shape of the particular boat to be carried. The rigidity of the bunks necessitates that the boat be held in a precise position on the trailer in order that its weight is evenly distributed thereon. Further, because the bunks are concave in shape with the forward and rearward ends pointing substantially upwardly, the trailer must be nearly completely submerged before the sailboat held thereby may be moved onto or off the trailer. Thus it is often necessary to provide an additional trailer tongue that enables extension of the distance between the trailer and towing vehicle, thereby allowing movement of the trailer into deeper water when necessary. If the trailer is to be loaded onto a submerged or nearly submerged trailer much difficulty is experienced in correctly positioning the boat over the submerged hull engaging members.

The present trailer includes longitudinal resilient bunks that are carried by a walking beam arrangement on the central supporting framework. The bunks are therefore free to flex in response to the weight of the boat thereon and to conform to the hull shape. However, when the boat is unloaded from the trailer, the resilient bunks will return to a normal relatively flat condition. When loading, the hull may engage the bunks and bend them slightly downwardly as the boat is pulled onto the trailer. Similarly, when unloading a sailboat, as the trailer is being backed into the water, the bunks will return to a relatively normal flat condition as buoyancy of the boat reduces the load applied thereto. The boat may float freely over the bunks once they return to a flat condition with no danger of the hull scraping against an upturned bunk end.

SUMMARY OF THE INVENTION

A boat trailer is described that comprises a wheel supported framework adapted to support the weight of a boat and to be moved along by a towing vehicle. A bow securing means is mounted at a forward end of the framework for engaging the bow of the boat when held on the trailer in the loaded position. The bow securing means further prevents longitudinal motion of the boat relative to the trailer while being carried along behind a towing vehicle. Longitudinally resilient hull engaging bunk means are movably mounted on opposite longitudinal sides of the framework. The bunk means include longitudinal areal hull engaging surfaces thereon for conforming to the hull configuration and for evenly receiving the weight of the boat over the entire areal surface. Weight transfer means is further provided between the resilient hull support bunk means and framework for distributing weight carried through the bunk means to selected points on the framework. The transfer means accomplishes this while simultaneously allowing flexure of the bunk means under the weight of a boat held thereon.

One object of the present invention is to provide a boat trailer wherein the weight of the boat is evenly distributed along flexible longitudinal bunks that will automatically conform to the hull configuration and thereby provide a maximum areal surface for receiving weight of the boat thereon.

It is another object to provide such a boat trailer with longitudinal resilient bunks that enable a boat to be loaded or unloaded in relatively shallow water.

It is a still further object to provide such a boat trailer that includes longitudinal flexible bunks that will not gouge into or otherwise damage a boat hull during loading or unloading operations.

It is yet another object to provide such a trailer that is adjustable to accommodate many different size and shape boats and hull configurations.

A still further object is to provide such a boat trailer that is simple in construction, inexpensive to manufacture, and relatively maintenance free.

These and yet further objects and advantages will become apparent upon reading the following description which, taken with the accompanying drawings describe a preferred form of the present invention.

BRIEF DESCRIPTION OF THE DRAWINGS

FIG. 5 is an enlarged fragmentary view taken along one side at the end of the trailer and looking forward therefrom;

FIG. 6 is an enlarged sectional view taken substantially along line 6—6 in FIG. 1; and FIG. 7 is a fragmentary plan sectional view taken along line 7—7 in FIG. 5.

DETAILED DESCRIPTION OF A PREFERRED EMBODIMENT

Figure 1:
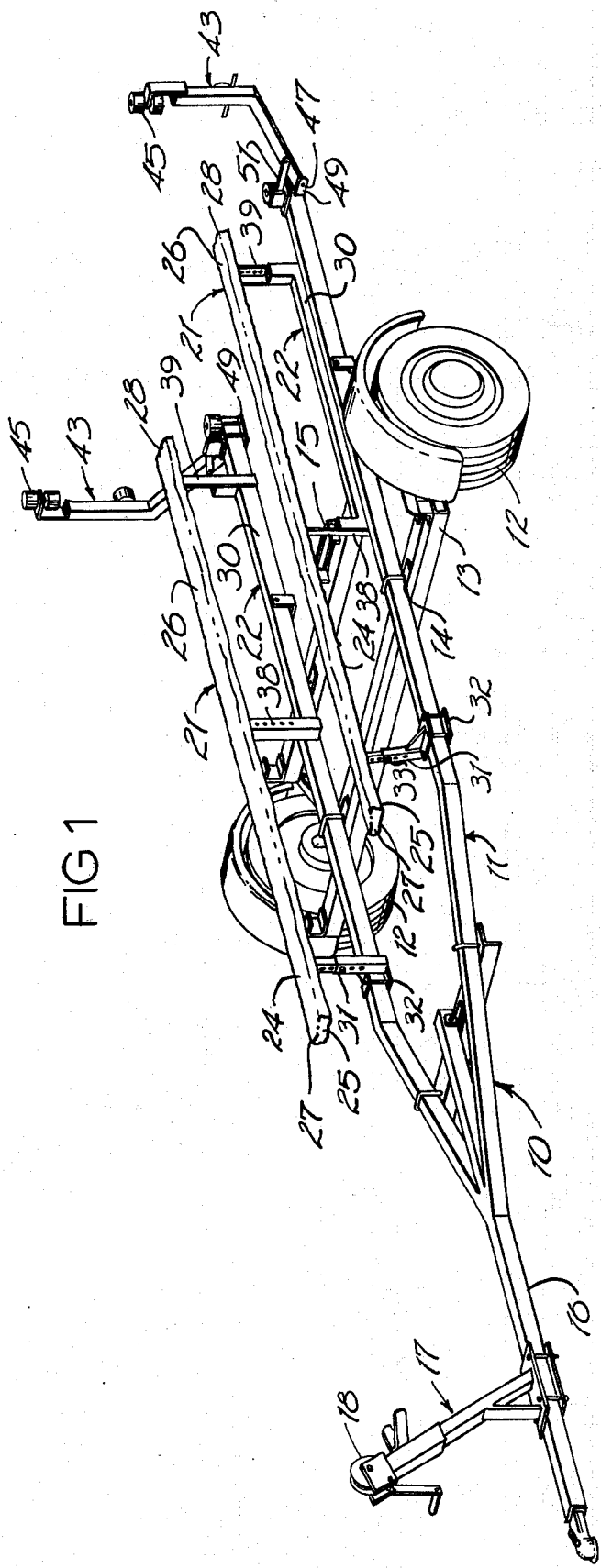
FIG. 1 is a pictorial view of a preferred form of the present invention.

A trailer of a preferred form of the invention is shown in the accompanying drawings and is designated therein by the reference character 10. As may be seen, the trailer 10 includes a longitudinal framework 11 supported by laterally spaced wheels 12. The wheels are carried by an axle carriage 13 that is attached by adjustable brackets 14 to the framework 11. A keel roll 15 (FIG. 1) is mounted on the carriage 13 at a distance midway between the wheels 12 for receiving the weight of a centerboard type sailboat (not shown).

At a forward end 16 of trailer 10, there is provided a bow securing means 17 for securing a boat in a loaded position on the trailer and for preventing longitudinal movement thereof when in a loaded condition. The bow securing means 17 includes a winch 18 that may be hand or motor operated to facilitate loading and unloading of a boat.

Very important features of the present invention are provided by a bunk means 21 and weight transfer means 22 that serve to engage and receive the primary weight of the boat when held in a loaded condition and to transfer such weight to the framework 11.

Bunk means 21 basically includes two laterally spaced resilient planks 24. The planks 24 are preferably formed of wood or other resilient material that will flex a determined amount along its length under loaded conditions. The planks 24 are covered by a cushioning carpet material 25 to cushion the hull and protect the hull finish from the rigid plank surfaces. Each cushioned plank 24 includes a rectangular hull engaging surface 26. The resiliency of the planks 24 and provision of weight transfer means 22 enable the whole area of each hull engaging surface 26 to conform with and intimately engage the boat hull when loaded thereon. Therefore, the weight of the boat is received and distributed over the entire area of surfaces 26.

Figure 2:
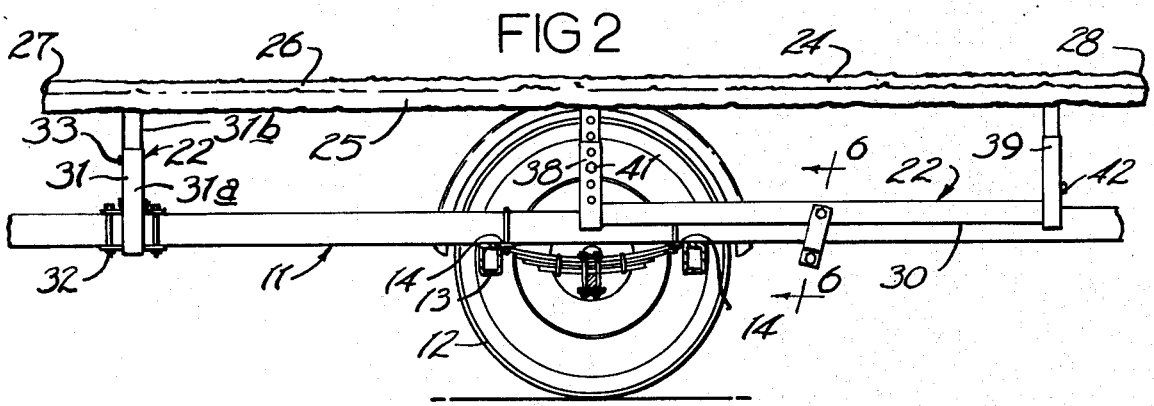
FIG. 2 is an enlarged fragmentary view showing one side of the present trailer in an unloaded condition.

FIG. 2 shows one of the planks 24 in an unloaded normal condition. In this condition, the plank 24 is substantially straight between its forward end 27 and rearward end 28. However, in a loaded condition, the plank 24 will flex to a concave shape, intimately conforming to the configuration of the boat hull held thereon. This condition is shown somewhat diagrammatically by FIG. 3. Further, as a boat is being loaded, the planks 24 may engage the boat hull at rearward plank ends 28 as the boat moves forwardly onto framework 11. The resulting downward force on rearward plank ends 28 results in a convex longitudinal bend along planks 24 wherein rearward ends 28 are bent downwardly to slide along the boat hull rather than gouge or scrape over the hull as the boat is drawn onto the trailer.

The weight transfer means 22 includes a pair of walking beams 30 located under planks 24. Means 22 also includes stationary upright supports 31 located beneath planks 24 at forward plank ends 27. The stationary upright supports 31 are adjustably mounted on the framework 11 by mounting brackets 32. Elevational adjustment of the forward plank ends 27 is accomplished by selective placement of an adjusting bolt 33 that fits within complementary apertures within telescoping members 31a and 31b of stationary support 31.

Walking beams 30 are mounted to framework 11 for free pivotal movement about horizontal axes. A pivot bracket 34 (FIG. 6) is mounted by a clamp assembly 35 to frame 11. Bracket 34 receives a pivot bolt 36 that extends through bracket 34 and walking beam 30 at its longitudinal center. Upright elevationally adjustable supports 38 and 39 are provided at opposite ends of the walking beams 30 to receive and support the planks 24. Elevational adjustment of supports 38 and 39 may be accomplished through adjusting bolts 41 and 42 in a manner similar to that described for the forward stationary upright support 31.

FIG. 6 illustrates the manner in which planks 24 are pivotably mounted to the uprights 31, 38 and 39. With each upright support, a pivot bolt and nut assembly 37 (FIG.6) is provided to engage a downwardly projecting bracket 40. Brackets 40 are fixed to the bottom sides of planks 24. The bolt and nut assemblies 37 are received in slightly oversized holes formed in brackets 40 to allow for free bending movement of planks 24 along their lengths. In addition, the bolt and nut assemblies 37 enable free pivotal movement of the planks 24 about a longitudinal horizontal axis. Relative pivotal positions are shown in FIG. 6 by solid and dashed lines.

While bunk means 21 provides support for a boat held in a loaded condition on trailer 10, lateral support and stability is provided by upright side hull supports 43. The supports include paired opposed rollers 45 that are selectively adjustable to engage the boat hull along the upright hull sides near the rearward or aft end. Supports 43 are pivotably mounted to mounting brackets 49 which are adjustably mounted to framework 11. The pivot axis of each support 43 is defined by a bolt 47 as shown in particular detail by FIG. 5. A release means 51 is provided that enables adjustment of the lateral distance between rollers 45 and further allows swinging outward movement of the supports between operative positions as shown by FIGS. 1 and 5 in solid lines, and an inoperative position as shown by FIG. 5 in phantom line.

The release means 51 includes a threaded shaft 52 (FIGS. 5 and 7) that is held by a bracket 54 to framework 11. Shaft 52 is pivotably mounted to a connecting bar 57 that extends outwardly to engage a slidable pin 56. The pin 56 extends through apertures within supports 43 and a complementary aperture in the bar 57. The pin may therefore pivotably secure the bar end to supports 43 when inserted through the appropriate apertures. Upon removal of pin 56, the supports 43 may freely pivot between the previously described positions. Compression of the rollers 45 against the sides of the boat hull may be selectively adjusted by turning the nuts 53 to pull the rollers inward against the boat hull or allowing them to pivot slightly outwardly away from the boat hull.

Figure 3:
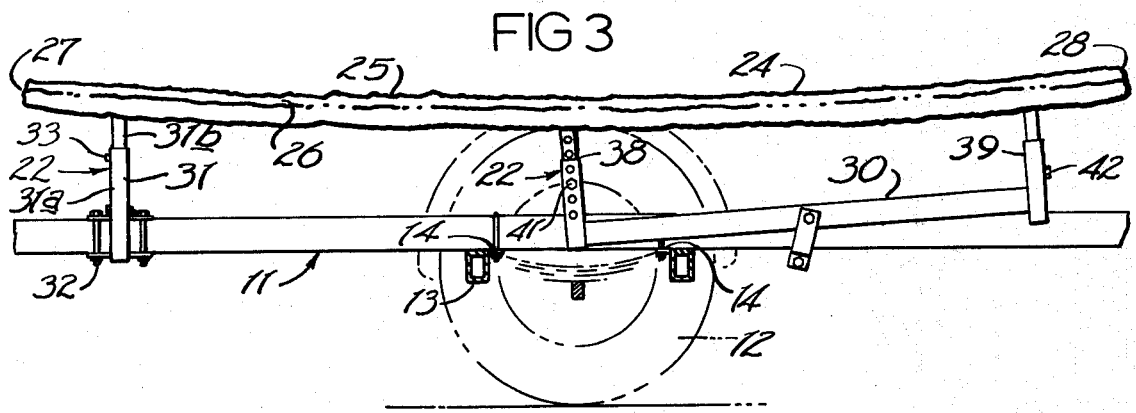
FIG. 3 is a view similar to FIG. 2 only showing the configuration of the elements shown in FIG. 2 when a boat is loaded thereon.

In describing operation of the present trailer 10, discussion will first be directed to the procedures for unloading a boat. When loaded on the trailer 10, the weight of a boat will cause bunk means 21 to conform to the hull configuration. The resulting bunk configuration is shown by FIG. 3. The objective when unloading is to reduce the load carried by the bunks, and then slide the boat longitudinally along the bunks until it becomes clear of the trailer. Prior to backing the trailer and boat into the water, the pins 56 are pulled and side hull supports 43 are moved to the outward inoperative position. This facilitates longitudinal outward movement of the boat from the trailer. Once this is done, the trailer may be backed into the water until the boat becomes somewhat buoyant and allows the planks 24 to flex or return to the normal condition as shown by FIG. 2. As this happens, the rearward plank ends no longer project upwardly into the rearward path of the boat and thus present no obstruction to rearward movement during the unloading procedure.

The hull may either be disconnected from the winch 18 or sufficient rope from the winch may be played out to allow the boat to be moved from engagement with the trailer bunks before the trailer is pulled back onto dry land.

The simplicity of the unloading is attributable to the operation of the bunk means 21. As the weight of the boat is received by the water, less load is applied to the planks 24 and they are allowed to return to the normal straightened condition. This lowers the rearward plank ends and moves them away from the rearward path of the hull.

Figure 4:
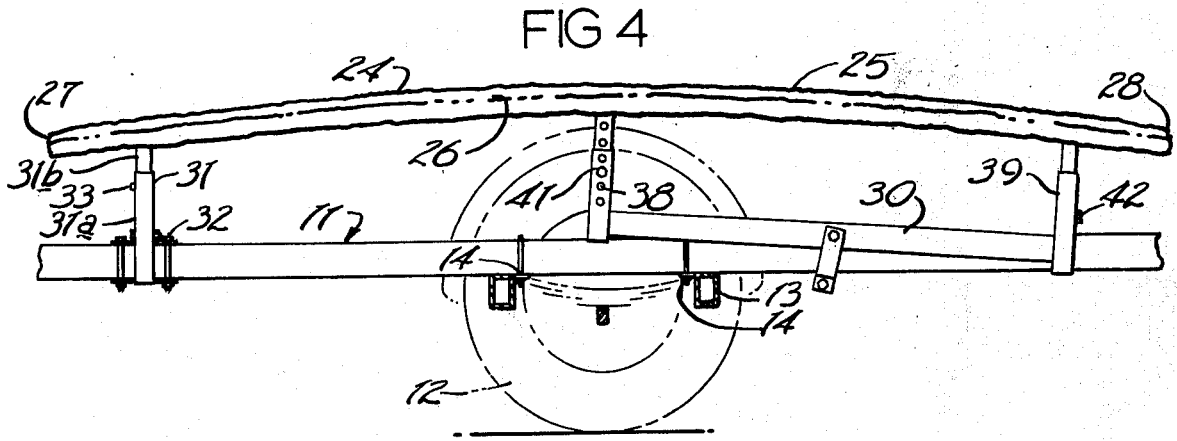
FIG. 4 is also a view similar to FIG. 2 only showing the responsive position of elements therein during boat loading procedures.

When loading a boat from the water onto a trailer 10, the user backs the trailer into the water to a depth similar to that required for unloading the boat. He then guides the boat onto the trailer with the bow moving forwardly between the bunk planks 24. The bow will engage the rearward bunk ends 28 and bend the planks into the configuration shown by FIG. 4. However, since the planks are of a flexible resilient nature, the ends 28 will not gouge into the hull. Rather, they will slide along the forwardly moving hull surface, conforming to the hull configuration as it moves by. The bunks will finally assume a concave shape, conforming intimately on opposite sides of the hull to the particular hull configuration engaged by the surfaces 26. Once the boat is in a proper loaded position, the hull is secured by means 17 and the trailer is pulled out from the water and onto dry land. The user then moves the side hull supports back into an operative position wherein the rollers 45 are securely engaged with the hull sides. He secures the supports in this position by inserting the pins 56. The centerboard may then be lowered onto the center keel roll 15 once the boat has been loaded. This is done simply by releasing the keel to move gravitationally toward its downward operative position from a previously retracted position. Thus secured, the boat is ready for transportation.

It should be noted that even though the boat may be positioned slightly differently upon the bunk means 21 each time it is loaded onto the trailer, the planks 24 will conform intimately with the hull configuration at that position. The entire hull engaging surface 26 of each plank 24 fits flush against the hull surface and receives nearly the total weight of the boat thereon. Transfer means 22 allows full flexibility of the planks 24 while further transmitting the weight carried thereby to the framework 11.

It should be noted that the above description and drawings are given only to disclose a preferred form of the present invention. Only the following claims are to be taken as limitations upon the scope of this invention.

What I claim is:

1. A boat trailer, comprising:
   a wheel supported framework for supporting the weight of a boat and adapted to be moved along by a towing vehicle;
   bow securing means mounted at a forward end of the framework for engaging the bow of the boat when held on the trailer in a loaded position and for preventing longitudinal motion of the boat relative to the trailer;
   longitudinally resilient hull engaging bunk means movably mounted on opposite longitudinal sides of the framework and having longitudinal areal hull engaging surfaces thereon for conforming to the hull shape of the boat and for evenly receiving the weight of the boat along the entire areal surface;
   and weight transfer means mounted between the resilient hull support means and framework for distributing weight carried by the bunk means to selected points on the framework while allowing flexure of the bunk means under the weight of the boat;
   said bunk means being comprised of a pair of elongated flexible members mounted transversely apart and extending longitudinally along the framework to engage the boat hull along opposite sides of its longitudinal center line;
   said weight transfer means comprising:
   upright brace members connecting the forward ends of the respective elongated flexible members and the framework;
   longitudinal walking beams mounted to the framework below the respective elongated flexible members for free pivotal movement about horizontal transverse axes;
   forward upright supports extending upwardly from forward ends of the beams and pivotally mounted to the elongated flexible members adjacent their longitudinal centers; and
   rearward upright supports extending upwardly from rearward ends of the beams and pivotally mounted to the longitudinal flexible members adjacent their rearward ends.

2. The trailer set out by claim 1 wherein the bunk means is comprised of a pair of elongated planks mounted transversely apart and extending longitudinally along the framework to engage the boat hull along opposite longitudinal sides of its longitudinal centerline.

3. The trailer as defined by claim 1 wherein the upright brace members and the forward and rearward upright supports include height adjusting means for adjustably locating the planks elevationally over the framework.

4. The trailer as defined by claim 1 further comprising:
   side hull supports pivotably mounted adjacent a rearward end of the framework and selectively movable between a first position engaging opposite sides of a boat hull when held on the framework in a loaded position to prevent lateral movement of the loaded boat relative to the trailer and a second position laterally clear of the opposite boat hull sides; and
   rollers rotatably mounted at upper ends of the hull supports for engaging and rolling against the boat hull sides.

5. The trailer as defined by claim 4 further comprising:
   adjustable release means intermediate the side hull supports and framework for selectively adjusting the rollers against the sides of a boat hull when the side hull supports are located in the first position and for selectively releasing the supports to move freely to the second position.

* * * * *